(12) United States Patent
Kurtz et al.

(10) Patent No.: US 8,550,060 B2
(45) Date of Patent: Oct. 8, 2013

(54) GLOW PLUG HEATER CONTROL

(75) Inventors: Eric Kurtz, Dearborn, MI (US); Paul Joseph Tennison, West Bloomfield, MI (US); David A. May, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/619,639

(22) Filed: Sep. 14, 2012

(65) Prior Publication Data

US 2013/0087122 A1    Apr. 11, 2013

Related U.S. Application Data

(63) Continuation of application No. 13/270,906, filed on Oct. 11, 2011, now Pat. No. 8,281,772.

(51) Int. Cl.
*F02D 41/00* (2006.01)
*F23N 5/26* (2006.01)
*F23R 3/40* (2006.01)

(52) U.S. Cl.
USPC ........................................ 123/676; 123/145 A

(58) Field of Classification Search
USPC ........................ 123/676, 143 R, 145 A, 145 R
See application file for complete search history.

(56) References Cited

U.S. PATENT DOCUMENTS

| | | | |
|---|---|---|---|
| 5,974,792 A | 11/1999 | Isobe | |
| 6,009,369 A | 12/1999 | Boisvert et al. | |
| 6,647,937 B2 | 11/2003 | Nishimoto | |
| 8,281,772 B2 * | 10/2012 | Kurtz et al. | 123/676 |
| 2009/0012695 A1 | 1/2009 | Kernwein et al. | |
| 2009/0271098 A1 | 10/2009 | Hosaka | |
| 2010/0126464 A1 | 5/2010 | Schumacher et al. | |
| 2010/0280735 A1 | 11/2010 | Moritz et al. | |

FOREIGN PATENT DOCUMENTS

JP   03175155 A * 7/1991

OTHER PUBLICATIONS

Kurtz, Eric, et al., "Glow Plug Heater Control", U.S. Appl. No. 13/270,939, filed Oct. 11, 2011, 60 pgs.

* cited by examiner

*Primary Examiner* — Hieu T Vo
(74) *Attorney, Agent, or Firm* — Julia Voutyras; Alleman Hall McCoy Russell & Tuttle LLP

(57) ABSTRACT

Methods and systems for operating a glow plug are disclosed. In one example, current supplied to a glow plug can be controlled to promote combustion stability of a cylinder after an engine start. Engine feedgas hydrocarbons may be reduced during conditions where combustion stability may be otherwise reduced in order to reduce tailpipe emissions.

20 Claims, 11 Drawing Sheets

GLOW PLUG HEATER CONTROL

CROSS REFERENCE TO RELATED APPLICATIONS

The present application is a continuation of U.S. patent application Ser. No. 13/270,906 filed Oct. 11, 2011, now U.S. Pat. No. 8,281,772 B2, issued on Oct. 9, 2012, the entire contents of which are incorporated herein by reference for all purposes.

BACKGROUND/SUMMARY

Diesel engines compress air-fuel mixtures to initiate combustion in engine cylinders. Glow plugs may be used during starting of a cold diesel to assist engine starting when compression of the air-fuel mixture may be insufficient to produce automatic ignition of an air-fuel mixture. The glow plugs may be positioned in a combustion chamber to elevate the temperature of a portion of an in cylinder air-fuel mixture so that the air-fuel mixture may ignite when compressed. Once the engine is started the glow plugs may be turned off or operated at a low current for a predetermined amount of time to conserve energy and extend glow plug life. However, it may not be desirable to deactivate glow plugs after an engine start simply because the engine is started. Further, it may be desirable during some engine operating conditions to control glow plugs responsive to conditions other than an indication that an engine is started.

The inventors herein have recognized the above-mentioned disadvantages and have developed an engine operating method, comprising: performing combustion in a cylinder of an engine; and retarding combustion phasing in the cylinder and increasing current supplied to a glow plug in the cylinder in response to a temperature of a catalyst and a temperature of the engine.

By selectively operating glow plugs after engine start during different engine operating conditions, engine hydrocarbons may be reduced while engine combustion stability is increased. Further, engine heat output can be increased when glow plugs are activated to improve catalyst light off or regeneration of emissions control devices. For example, if an engine enters low load conditions where temperature of a catalyst coupled to an exhaust system of the engine may be reduced, glow plugs can be activated and combustion phasing retarded so that catalyst efficiency may be maintained or improved. Further, in systems where a motor is coupled to the engine, the motor may be adjusted to compensate or account for the response time of the glow plug so that engine emissions can be controlled during the time it takes for the glow plug to reach a desired operating temperature. In this way, glow plugs may be selectively operated so as to improve engine operation and emissions.

The present description may provide several advantages. In particular, the approach may improve engine operation during conditions where emissions control devices coupled to the engine are operating with less than desired efficiency. In addition, the approach provides compensation for glow plug heating response time. Further, the approach may reduce engine emissions after the engine reaches warmed up operating conditions by allowing the engine to retard combustion phasing while continuing to provide stable combustion.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
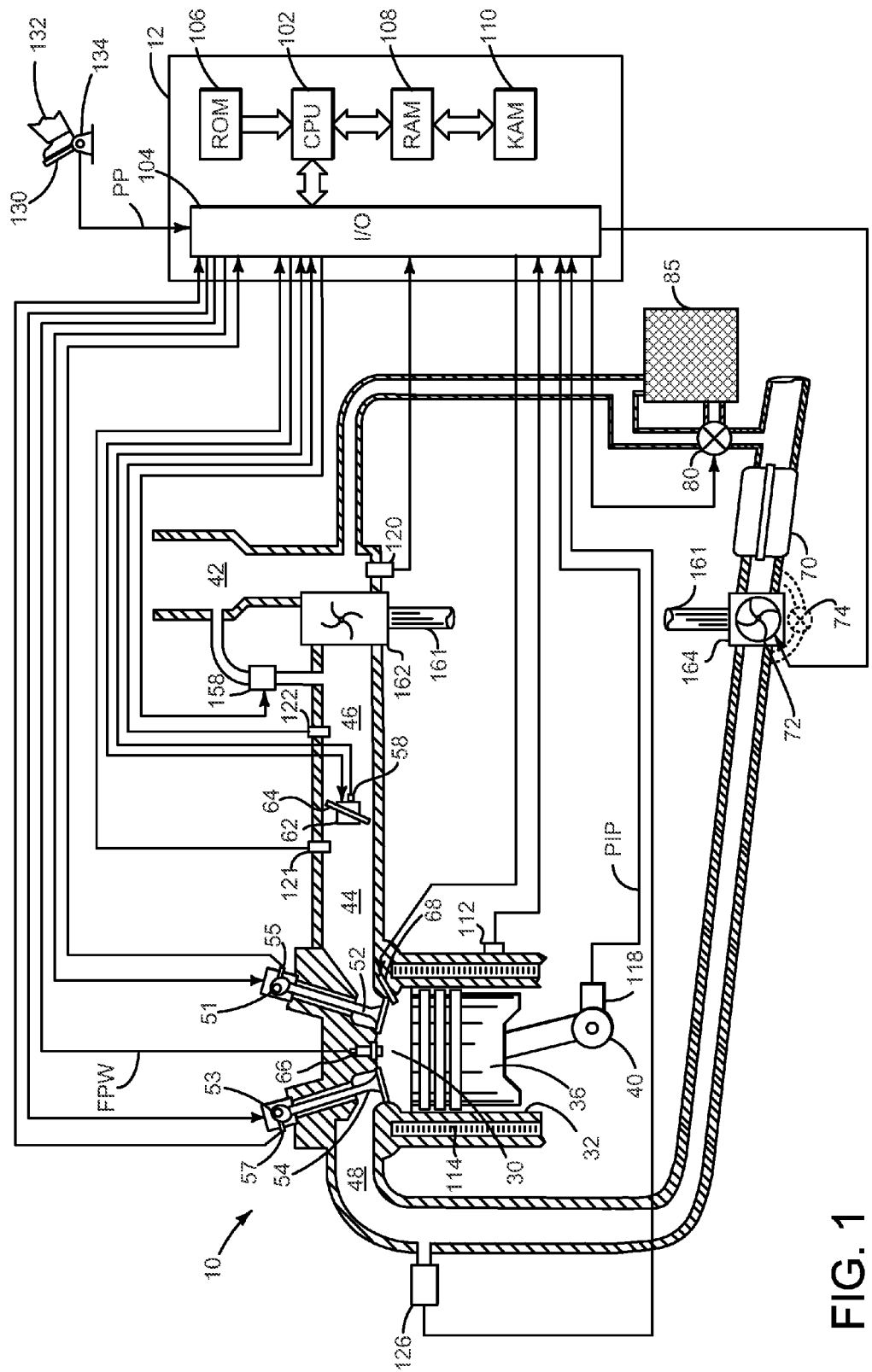
FIG. 1 shows a schematic depiction of an engine.
Figure 2:
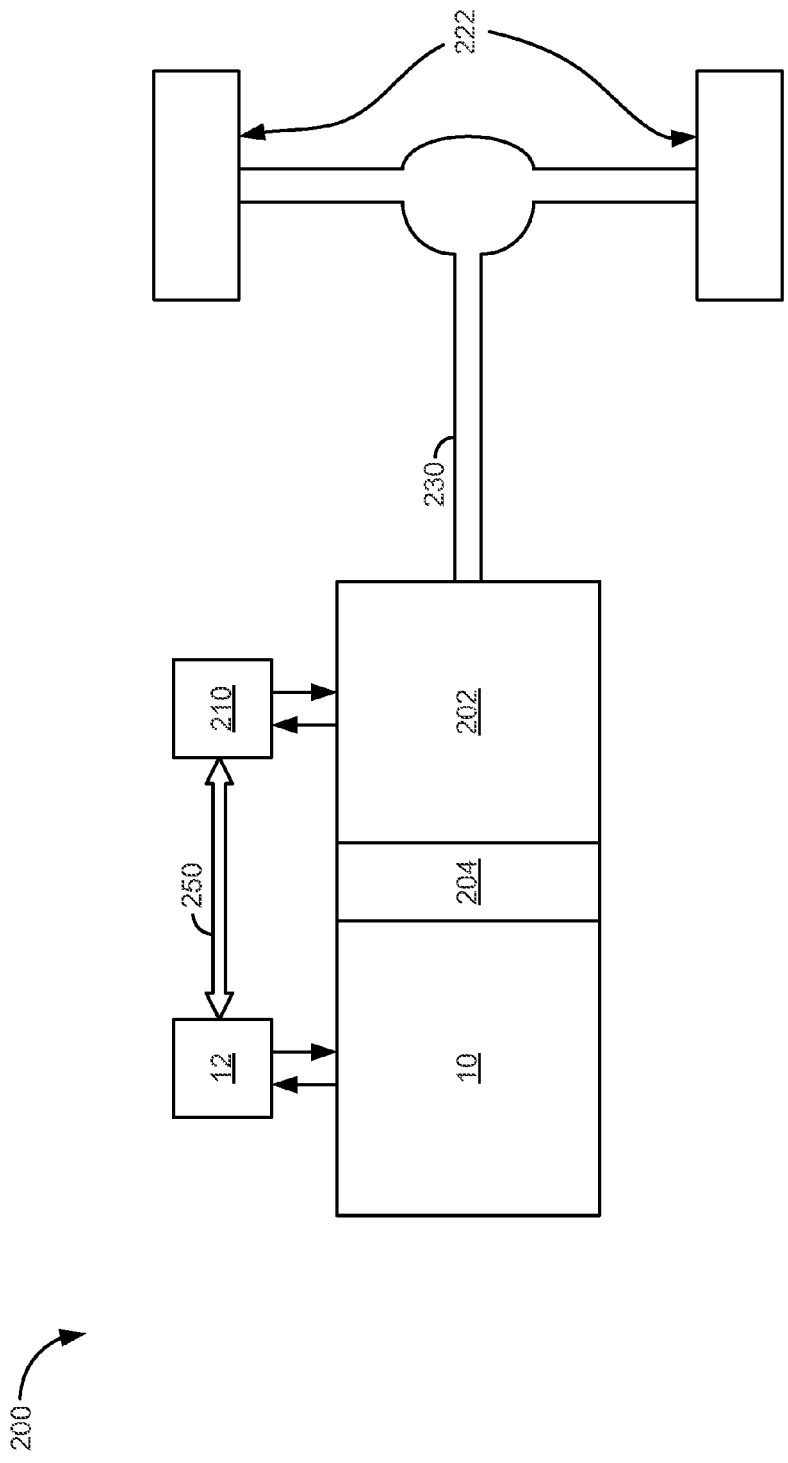
FIG. 2 shows example hybrid powertrain including the engine of FIG. 1.
Figure 3:
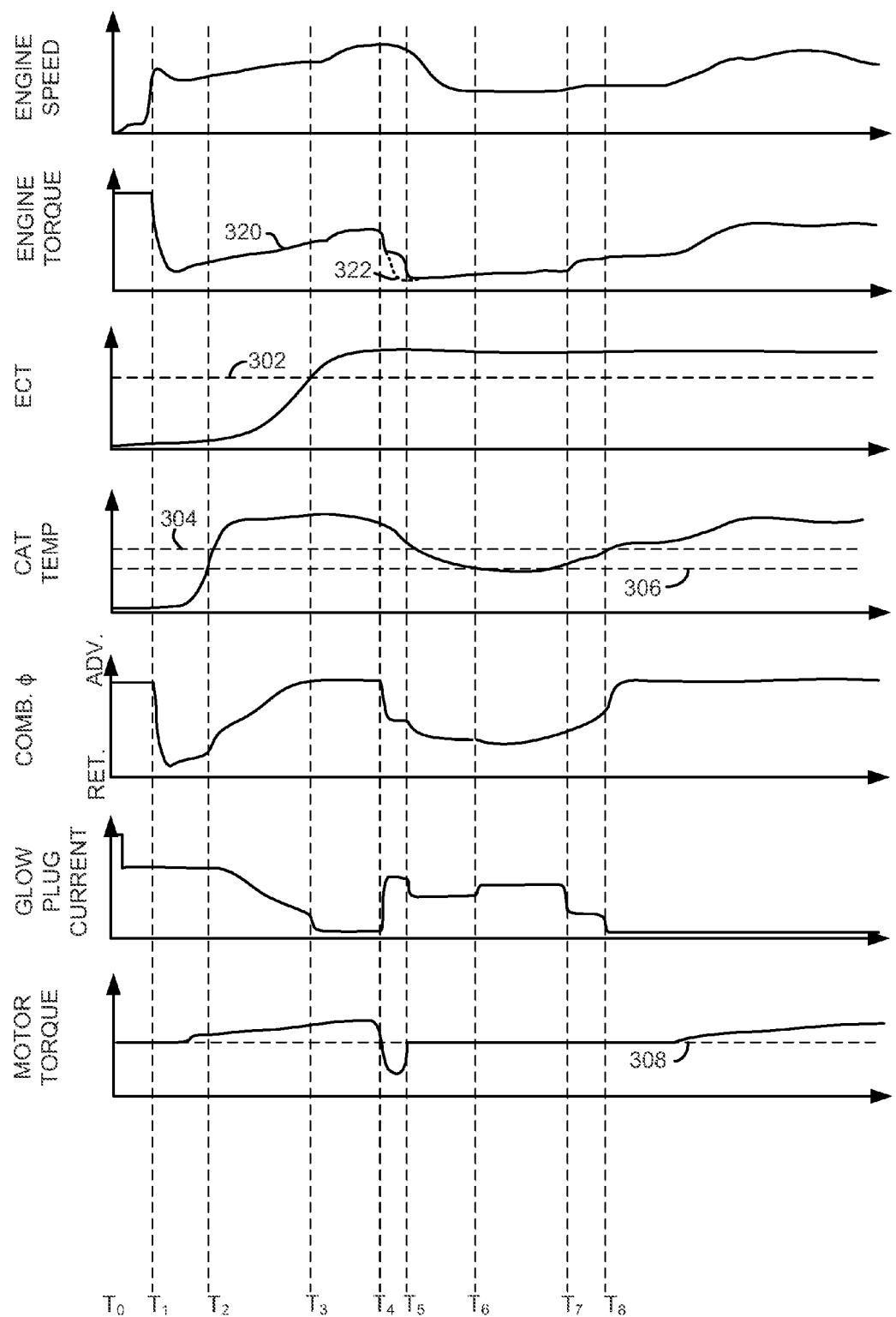
FIGS. 3-4 show signals of interest during two different engine operating sequences.
Figure 4:
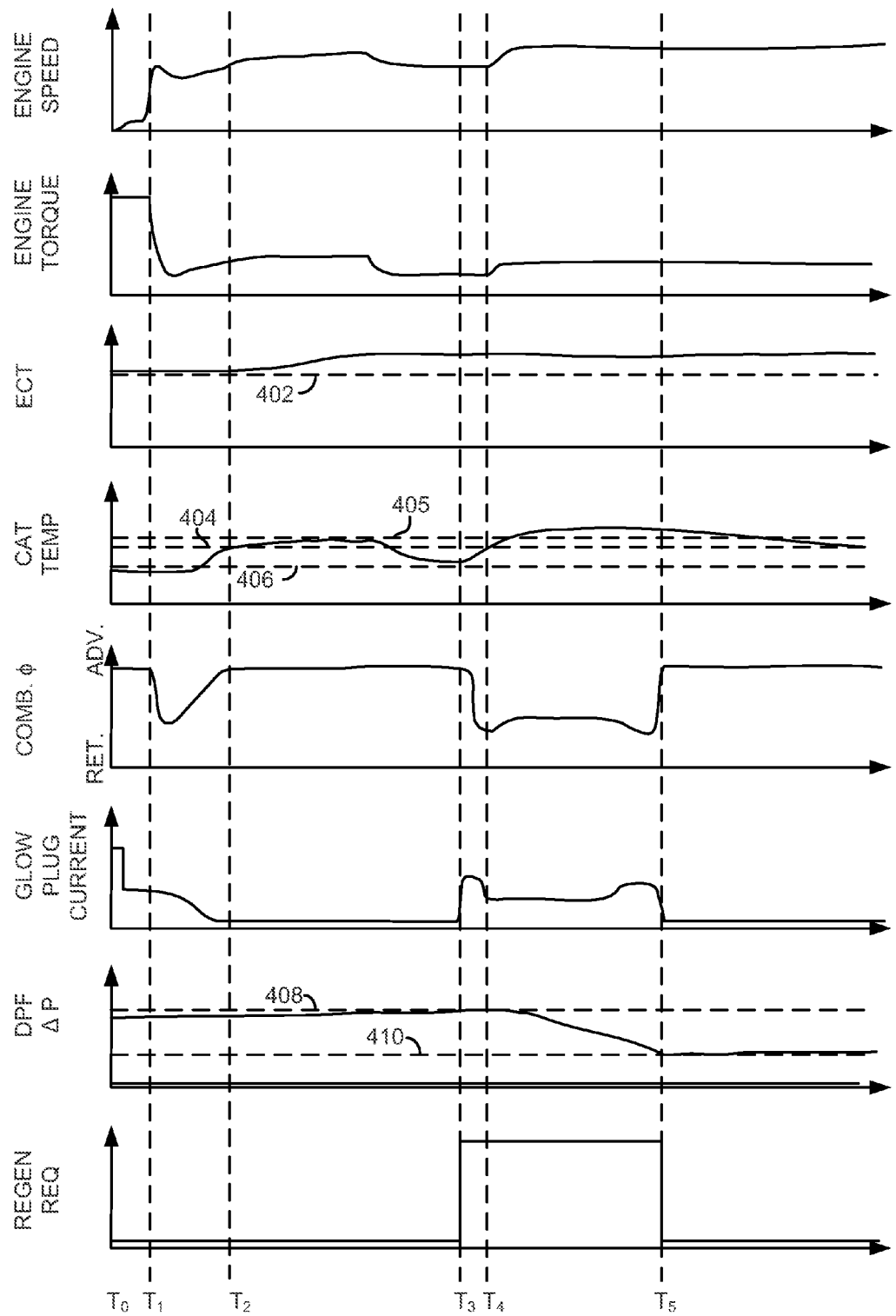
Figure 5:
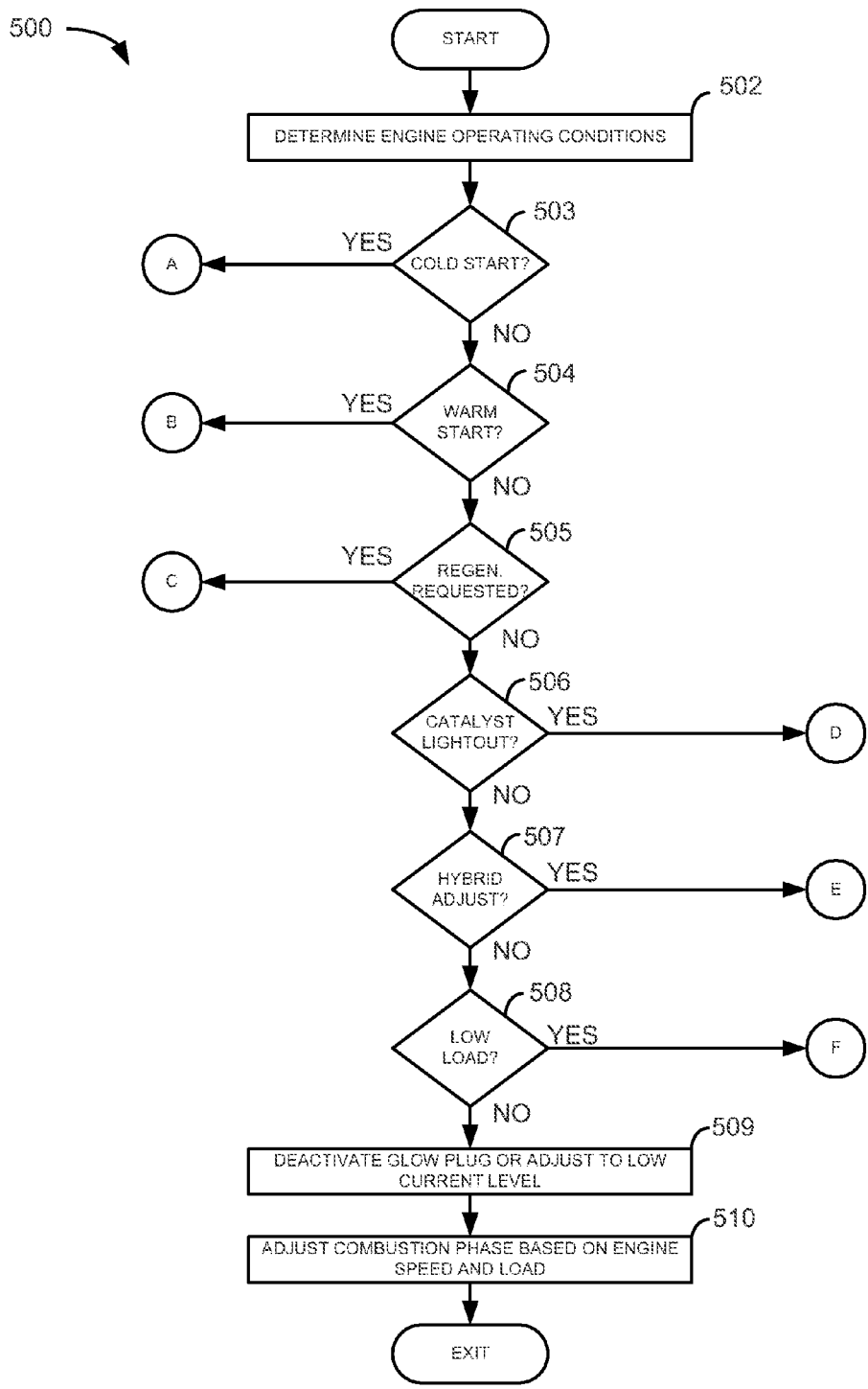
FIGS. 5-11 show a flowchart of an example method for controlling a glow plug.

The present description is related to improving engine operation via selectively operating glow plugs. FIG. 1 shows one example of a boosted diesel engine where the method of FIGS. 5-11 may adjust glow plug operation and combustion phasing to improve engine starting, reduce engine emissions, and improve emission control device efficiency. FIG. 2 shows an example powertrain including the engine shown in FIG. 1. FIGS. 3 and 4 show signals of interest during two different engine operating sequences. FIGS. 5-11 show a flowchart of an example method for selectively operating glow plugs.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57.

Fuel injector 66 is shown positioned to inject fuel directly into combustion chamber 30, which is known to those skilled in the art as direct injection. Fuel injector 66 delivers fuel in proportion to the pulse width of signal FPW from controller 12. Fuel is delivered to fuel injector 66 by a fuel system (not shown) including a fuel tank, fuel pump, fuel rail (not shown). Fuel pressure delivered by the fuel system may be adjusted by varying a position valve regulating flow to a fuel pump (not shown). In addition, a metering valve may be located in or near the fuel rail for closed loop fuel control. A pump metering valve may also regulate fuel flow to the fuel pump, thereby reducing fuel pumped to a high pressure fuel pump.

Intake manifold 44 is shown communicating with optional electronic throttle 62 which adjusts a position of throttle plate 64 to control air flow from intake boost chamber 46. Compressor 162 draws air from air intake 42 to supply boost chamber 46. Exhaust gases spin turbine 164 which is coupled to compressor 162 via shaft 161. In some examples, a charge air cooler may be provided. Compressor speed may be adjusted via adjusting a position of variable vane control 72 or compressor bypass valve 158. In alternative examples, a waste gate 74 may replace or be used in addition to variable vane control 72. Variable vane control 72 adjusts a position of variable geometry turbine vanes. Exhaust gases can pass through turbine 164 supplying little energy to rotate turbine 164 when vanes are in an open position. Exhaust gases can pass through turbine 164 and impart increased force on turbine 164 when vanes are in a closed position. Alternatively, wastegate 74 allows exhaust gases to flow around turbine 164 so as to reduce the amount of energy supplied to the turbine. Compressor bypass valve 158 allows compressed air at the outlet of compressor 162 to be returned to the input of compressor 162. In this way, the efficiency of compressor 162 may be reduced so as to affect the flow of compressor 162 and reduce intake manifold pressure.

Combustion is initiated in combustion chamber 30 when fuel automatically ignites as piston 36 approaches top-dead-center compression stroke. In some examples, a universal Exhaust Gas Oxygen (UEGO) sensor 126 may be coupled to exhaust manifold 48 upstream of emissions device 70. In other examples, the UEGO sensor may be located downstream of one or more exhaust after treatment devices. Further, in some examples, the UEGO sensor may be replaced by a NOx sensor that has both NOx and oxygen sensing elements.

At lower engine temperatures glow plug 68 may convert electrical energy into thermal energy so as to raise a temperature in combustion chamber 30. By raising temperature of combustion chamber 30, it may be easier to ignite a cylinder air-fuel mixture via compression.

Emissions device 70 can include a particulate filter and catalyst bricks, in one example. In another example, multiple emission control devices, each with multiple bricks, can be used. Emissions device 70 can include an oxidation catalyst in one example. In other examples, the emissions device may include a lean NOx trap or a selective catalyst reduction (SCR), and/or a diesel particulate filter (DPF).

Exhaust gas recirculation (EGR) may be provided to the engine via EGR valve 80. EGR valve 80 is a three-way valve that closes or allows exhaust gas to flow from downstream of emissions device 70 to a location in the engine air intake system upstream of compressor 162. In alternative examples, EGR may flow from upstream of turbine 164 to intake manifold 44. EGR may bypass EGR cooler 85, or alternatively, EGR may be cooled via passing through EGR cooler 85. In other, examples high pressure and low pressure EGR system may be provided.

Controller 12 is shown in FIG. 1 as a conventional microcomputer including: microprocessor unit 102, input/output ports 104, read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing accelerator position adjusted by foot 132; a measurement of engine manifold pressure (MAP) from pressure sensor 121 coupled to intake manifold 44; boost pressure from pressure sensor 122 exhaust gas oxygen concentration from oxygen sensor 126; an engine position sensor from a Hall effect sensor 118 sensing crankshaft 40 position; a measurement of air mass entering the engine from sensor 120 (e.g., a hot wire air flow meter); and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

In some examples, the engine may be coupled to an electric motor/battery system in a hybrid vehicle as shown in FIG. 2. The hybrid vehicle may have a parallel configuration, series configuration, or variation or combinations thereof.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In some examples, fuel may be injected to a cylinder a plurality of times during a single cylinder cycle. In a process hereinafter referred to as ignition, the injected fuel is ignited by compression ignition resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is described merely as an example, and that intake and exhaust valve opening and/or closing timings may vary, such as to provide positive or negative valve overlap, late intake valve closing, or various other examples. Further, in some examples a two-stroke cycle may be used rather than a four-stroke cycle.

Referring now to FIG. 2 an example hybrid powertrain including the engine of FIG. 1 is shown. Hybrid powertrain 200 includes an engine 10 and engine controller 12 as is described in FIG. 1. Hybrid powertrain 200 also includes an electric motor 202 and motor controller 210. Engine controller 12 may communicate with motor controller 210 via communication link 250. In one example, communication link 250 is a CAN link. Electric motor 202 is shown mechanically coupled to engine 10 via transmission 204. Driveshaft 230 mechanically couples electric motor 202 to vehicle wheels 222. Electric motor 202 and engine 10 may provide torque to vehicle wheels 222 solely or together. Vehicle wheels 222 may be front wheels or rear wheels of the vehicle. In other examples, the engine and electric motor may be mechanically coupled in an alternative way.

Thus, the systems of FIGS. 1 and 2 provide for an engine having a combustion chamber; a glow plug protruding into the combustion chamber; and a controller including instructions to identify or anticipating a catalyst light out and retard combustion phasing in the combustion chamber and increasing current supplied to a glow plug in the combustion chamber in response to the light out after the engine has reached a temperature indicative of warm engine operating conditions. The engine system further comprises continuously supplying a current to the glow plug throughout a time when the engine is operating. In still other examples, the engine system continuously supplies current to the glow plug except when an engine parameter is greater than a threshold value. For example, a low level of current is continuously supplied to the glow plug except when engine load exceeds a threshold value (e.g., 0.75 load). The engine system further comprises additional controller instructions for increasing a negative torque supplied to the engine via a motor in response to a request to increase a temperature of the glow plug. The engine system further comprises additional controller instructions for retarding combustion phasing of the cylinder and increasing current supplied to the glow plug in response to a request to regenerate an emissions control device in an exhaust system that is coupled to the engine. In another example, the engine system further comprises additional controller instructions for gradually ramping glow plug current in response to the request to regenerate the emissions control device. The engine system further comprises additional controller instructions for advancing combustion phasing of the cylinder in response to a level of regeneration of the emissions control device, and where the emissions control device is a DPF or LNT.

Referring now to FIG. 3, simulated signals of interest during a first engine starting sequence is shown. The illustrated signals may be provided via executing instructions of the method of FIGS. 5-11 in controller 12 of FIG. 1. FIG. 3 is one example cold engine starting sequence and subsequent engine operation. Vertical lines $T_0$-$T_8$ represent times where particular events of interest occur.

The first plot from the top of FIG. 3 represents an engine speed. The engine speed may be sensed via a crankshaft sensor or via another known method. The X axis represents time and time increases from right to left. The Y axis represents engine speed and engine speed increases in the direction of the Y-axis arrow.

The second plot from the top of FIG. 3 represents engine torque and operator requested torque. The X axis represents time and time increases from right to left. Engine torque 320 and operator requested torque 322 increase in the direction of the Y axis arrow. Engine torque 320 substantially matches operator requested torque 322 except where the dotted line of operator requested torque 322 is visible.

The third plot from the top of FIG. 3 represents engine coolant temperature (ECT) versus time. The X axis represents time and time increases from right to left. The Y axis represents ECT and ECT increases in the direction of the Y-axis arrow. Horizontal line 302 represents a temperature threshold where a warm engine is indicated when ECT is greater (above) than horizontal line 302.

The fourth plot from the top of FIG. 3 represents catalyst temperature. The X axis represents time and time increases from right to left. The Y axis represents catalyst temperature and the catalyst temperature increases in the direction of the Y-axis arrow. Horizontal line 304 represents a desired catalyst temperature when specific engine control actions are taken to heat a catalyst. For example, if combustion phasing is adjusted to heat a catalyst, combustion phase is at least partially retarded until the temperature represented by line 304 is reached. Horizontal line 306 represents a catalyst light off temperature (e.g., a catalyst temperature above which an efficiency of the catalyst exceeds a threshold efficiency).

The fifth plot from the top of FIG. 3 represents engine combustion phase (e.g., crankshaft location of peak cylinder pressure for a cylinder, or alternatively crankshaft location of peak heat release for a cylinder). The combustion phase may be varied by adjusting fuel injection timing, engine EGR amount, boost amount, and air-fuel mixture temperature. The X axis represents time and time increases from right to left. The Y axis represents engine combustion phase and combustion phase advances in the direction of the Y-axis arrow.

The sixth plot from the top of FIG. 3 represents glow plug current. Glow plug temperature increases as glow plug current increases. The X axis represents time and time increases from right to left. The Y axis represents glow plug current and glow plug current increases in the direction of the Y-axis arrow.

The seventh plot from the top of FIG. 3 represents motor torque. Motor torque above horizontal line 308 is positive motor torque (e.g., the motor is supplying torque to the vehicle driveline) and motor torque below horizontal line 308 is negative motor torque (e.g., the motor is absorbing torque from the vehicle driveline to charge a battery). The X axis represents time and time increases from right to left. The Y axis represents motor torque.

At time $T_0$, engine speed is zero indicating that the engine is stopped. Further, the engine coolant temperature and catalyst temperature are at low levels indicating that the engine has not been operated for an extended period of time. Although the engine is not combusting, the combustion phase for engine cylinders is scheduled advanced in anticipation of an impending engine start request. Current is supplied to glow plugs at a higher level so as to quickly warm the glow plugs. In some examples, current supplied to glow plugs after key on and before engine cranking may be described as a push phase where the glow plugs are heated rapidly. Motor torque is at a low level since the vehicle has not been commanded to move. In some examples, motor torque can be increased to propel a vehicle to which the engine and motor are coupled before the engine is started.

Between time $T_0$ and time $T_1$, the engine is cranked allowing the engine to run up to idle speed beginning at time $T_1$. Engine torque is initially large since a higher level of engine torque may be required to accelerate the engine from stop. The combustion phase is retarded as engine speed reaches idle speed at time $T_1$. The glow plug current is adjusted to a reduced level after the current push phase is ended but still relatively high so as to improve combustion stability while the engine is cold. Further, engine feedgas hydrocarbon emissions may also be reduced during cold engine starting via maintaining glow plug current at a higher level while maintaining glow plug temperature below a threshold value.

Between time $T_1$ and time $T_2$, the engine speed increases as engine torque is increased in response to an operator torque request. ECT and catalyst temperatures remain at lower levels but begin to increase as combustion in engine cylinders heats the engine and the catalyst. The motor torque is also increased so that motor torque may augment engine torque to provide the torque requested by the driver. Combustion phase is retarded to its lowest level and is advanced somewhat thereafter to increase engine torque in response to the driver torque request.

At time $T_2$, the engine speed continues to increase along with engine torque. In addition, catalyst temperature reaches catalyst light off temperature as indicated by horizontal line 306. Combustion phasing advances in response to the catalyst reaching light off temperature but remains retarded so as to continue engine heating. ECT continues to increase.

At time $T_3$, ETC reaches a level of horizontal line 302 indicating that the engine has reached warm engine operating conditions. Engine speed and engine torque continue to increase and accelerate the vehicle. Catalyst temperature remains above the catalyst light-off temperature since engine load is at a higher level. Engine torque may be one indication of engine load. Engine air amount may also be an indication of engine load. Combustion phase is advanced as ECT increases toward desired ECT such that combustion phase is advanced to a state where combustion state is advanced or retarded responsive to engine speed and load but not to ECT and catalyst temperature since the ECT is controlled to the desired ECT (e.g., warm operating engine temperature). Glow plug current is reduced when ECT reaches the threshold of line 302. In this example, glow plug current is reduced to a level but not stopped. In other examples, current flow to the glow plug may be stopped when ECT and catalyst temperature are above threshold levels. By continuing to supply a low level of current to the glow plug, it may be possible to reduce current in rush to the glow plug when the glow plug is subsequently reactivated.

At time $T_4$, the engine torque request 320 and operator torque request 322 are reduced and engine speed begins to be reduced in response to an operator reducing the engine torque request. However, the operator torque request 322 is reduced to a lower level than engine torque 320. The engine torque is held higher so that engine speed can remain elevated and so that the engine does not enter a low torque level until the glow plug is at a desired temperature so that improved combustion stability may be provided. In one example, the glow plug operation is anticipated when an operator torque request is reduced from a higher level to a level where the glow plug is scheduled to be activated. The engine torque or load continues at a higher level in the presence of a low operator torque request and the engine torque is absorbed by the motor so that the net torque provided to the vehicle driveline is the operator requested torque. Thus, the motor torque switches from positive torque to negative torque to absorb the excess engine torque. The combustion phase is also retarded and current supplied to the glow plug is increased so as to improve engine combustion stability and reduce engine feedgas hydrocarbon emissions.

At time $T_5$, the glow plug reaches a desired temperature and current to the glow plug is reduced to limit glow plug temperature. In other examples, current to the glow plug may be maintained when the applied current is an amount to achieve a desired heater temperature. Combustion phasing is further retarded since the glow plug is at a desired temperature and since additional combustion phase can be tolerated without combustion stability degradation. The engine torque is also reduced and the motor torque is increased since the increased glow plug temperature can promote combustion stability and reduced hydrocarbons. Engine speed continues to decrease as the engine torque is decreased.

At time $T_6$, the catalyst temperature decreases to a level below the light off temperature indicating catalyst light out. Combustion phasing is further retarded and glow plug current is increased in response to catalyst light out. By retarding combustion phasing and increasing glow plug current, heat flux from the engine to the catalyst may be increased so as to bring the catalyst above light off temperature, thereby reducing tailpipe emissions. Further, increasing glow plug current may elevate glow plug temperature so as to promote combustion stability during retarded combustion phasing while also lowering or maintaining engine feedgas hydrocarbons.

At time $T_7$, engine torque demand is increased and the catalyst temperature exceeds light off temperature. Further, glow plug current is reduced in response to the elevated catalyst temperature and increased engine load. Combustion phase is also advanced to improve engine efficiency since catalyst temperature is greater than light off temperature. However, catalyst temperature is less than threshold temperature 304 so a portion of combustion retard is maintained. Further, glow plug current is adjusted to a level that is above a level when catalyst temperature is greater than threshold temperature 304.

In this way, glow plug current and combustion phase are adjusted after catalyst temperature is less that catalyst light off temperature until a desired catalyst temperature greater than the catalyst light off temperature is achieved by the catalyst. Thus, catalyst temperature hysteresis is provided so that glow plug current and combustion phasing are not activated and deactivated over a short time interval.

At time $T_8$, catalyst temperature exceeds threshold temperature 304. Combustion phase is further advanced and glow plug current is reduced in response to catalyst temperature exceeding threshold temperature 304. Engine speed and engine torque are shown at elevated levels where the engine outputs heat to keep the catalyst operating efficiently. Therefore, engine combustion phasing can be advanced and adjusted in response to engine speed and load without being adjusted for catalyst and engine temperature.

Referring now to FIG. 4, simulated signals of interest during a second engine starting sequence is shown. The illustrated signals may be provided via executing instructions of the method of FIGS. 5-11 in controller 12 of FIG. 1. FIG. 4 is one example of a warm engine starting sequence and subsequent engine operating sequence. FIG. 4 shares plots similar to the plots shown in FIG. 3. As such, the description of plots having the same labels between FIG. 3 and FIG. 4 is omitted for the sake of brevity. Vertical lines $T_0$-$T_5$ represent times where particular events of interest occur.

The first plot from the top of FIG. 4 represents an engine speed. The engine speed may be sensed via a crankshaft sensor or via another known method. The X axis represents time and time increases from right to left. The Y axis represents engine speed and engine speed increases in the direction of the Y-axis arrow.

The second plot from the top of FIG. 4 represents engine torque and operator requested torque. The X axis represents time and time increases from right to left. Engine torque and operator requested torque are represented by a single line since engine torque and operator torque are substantially the same in this example. Engine torque increases in the direction of the Y axis arrow.

In the third plot from the top of FIG. 4, horizontal line 402 represents a threshold engine temperature where the engine is determined to be at warm operating conditions. If engine temperature is below line 402 the engine may be determined to be cold. Otherwise, if engine temperature is above line 402, the engine may be determined to be warm.

In the fourth plot from the top of FIG. 4, horizontal line 406 represents a catalyst light off temperature. If catalyst temperature is below line 406, the catalyst may be determined not to be at light off conditions. If catalyst temperature is above line 406, the catalyst may be determined to be at light off conditions. Horizontal line 404 represents a desired catalyst temperature when engine control actions are taken to increase catalyst temperature. For example, when it is determined desirable to operate the glow plug to improve combustion stability while heating the catalyst, the desired catalyst temperature may be set or controlled to the temperature indicated by horizontal line 404. Horizontal line 405 represents a catalyst temperature where The fifth plot from the top of FIG. 4 represents engine combustion phase (e.g., crankshaft location of peak cylinder pressure for a cylinder, or alternatively crankshaft location of peak heat release for a cylinder). The combustion phase may be varied by adjusting fuel injection timing, engine EGR amount, boost amount, and air-fuel mixture temperature. The X axis represents time and time increases from right to left. The Y axis represents engine combustion phase and combustion phase advances in the direction of the Y-axis arrow.

The sixth plot from the top of FIG. 4 represents glow plug current. Glow plug temperature increases as glow plug current increases. The X axis represents time and time increases from right to left. The Y axis represents glow plug current and glow plug current increases in the direction of the Y-axis arrow.

The seventh plot from the top of FIG. 4 represents a pressure differential (ΔP) across a diesel particulate filter (DPF) versus time. The differential pressure increases in the direction of the Y axis. Time increases from the left to the right. Horizontal line 408 represents a pressure differential level where it is desirable to regenerate the DPF. Horizontal line 410 represents a pressure differential level where it is desirable to cease regeneration of the DPF. In some examples, the differential pressure level may be normalized for engine operating conditions so that the differential pressure regeneration levels 408 and 410 are adjusted for engine operating conditions such as engine air flow rate.

The eighth plot from the top of FIG. 4 represents a signal requesting regeneration of the DPF. In one example, the state of the regeneration request is based on the differential pressure across the DPF. If the differential pressure is at or greater than the threshold indicated by line 408, the regeneration request is made. The regeneration request remains active until the DPF is determined to be regenerated.

In this way, current supplied to glow plugs and combustion phasing can be adjusted to reduce engine emissions during warm engine starting and regeneration of emissions control devices in the engine exhaust system.

At time $T_0$, engine speed is zero indicating that the engine is stopped. Further, the engine coolant temperature and catalyst temperature are at levels indicating that the engine is warm at engine starting time. However, the catalyst is below light off threshold 406. Current is supplied to glow plugs at a higher level in a push phase so as to quickly warm the glow plugs since the glow plugs may cool down faster than the engine while the engine is stopped.

Between time $T_0$ and time $T_1$, the engine is cranked allowing the engine to run up to idle speed beginning at time $T_1$. The engine torque is initially large since a higher level of engine torque may be required to accelerate the engine from stop. The combustion phase is shown being retarded as engine speed reaches idle speed at time $T_1$ so that the catalyst may be quickly reheated. After the current push phase, the glow plug current is at a reduced but still relatively high so as to improve combustion stability while the catalyst temperature is increased via retarded combustion phasing. In particular, combustion phase is retarded after engine start in response to catalyst temperature. Thus, catalyst heating is increased via retarding combustion phasing.

At time $T_2$, the catalyst reaches desired catalyst temperature 404. The combustion phase is shown being gradually advanced with increasing catalyst temperature. Similarly, glow plug current is reduced to reduce glow plug temperature as combustion phase is advanced so as to lower glow plug temperature and power consumption. Engine temperature remains above temperature threshold 402 and DPF pressure differential is below pressure threshold 408 so that a DPF regeneration request is not generated by the controller.

Between time $T_2$ and time $T_3$, engine speed and torque vary according to vehicle conditions including driver demand torque. Engine temperature remains above temperature threshold 402 and catalyst temperature remains above catalyst light off temperature 406. Engine torque and engine speed are reduced just before time $T_3$; however, catalyst temperature remains above catalyst light off temperature. The DPF pressure differential gradually increases as the engine continues to operate and a small amount of current is shown flowing to the glow plug so that current inrush to the glow plug may be reduced when higher glow plug temperatures are requested.

At time $T_3$, the pressure differential across the DPF exceeds the pressure differential level 408 where it is desirable to regenerate the DPF. As a result, DPF regeneration is requested as indicated by the regeneration request signal transitioning to a high level. The glow plug current is increased along with the glow plug temperature in response to the pressure differential exceeding the level where it is desirable to regenerate the DPF. The combustion phase of the engine is retarded in response to the pressure differential exceeding the level where it is desirable to regenerate the DPF and in response to the glow plug temperature. In particular, when the glow plug temperature reaches a predetermined threshold level, the engine combustion phase is retarded.

At time $T_4$, the engine torque and engine speed are increased to a level where additional heat is provided to the exhaust. Further, the catalyst temperature exceeds the desired catalyst temperature where control actions are taken to engine operation to heat the catalyst. Therefore, engine combustion phasing is advanced and glow plug current and temperature are reduced. Further, in some examples current to the glow plug may be stopped during such conditions and a post injection during the exhaust stroke may be supplied to further heat the catalyst and DPF.

Between time $T_4$ and time $T_5$, combusting phase and glow plug current are reduced and increased as the differential pressure across the DPF is reduced. In some examples, the combustion phase retard and glow plug current may be held constant except for adjustments for engine speed and load so that the same amount of additional heat flux is provided by the engine throughout the DPF regeneration. Near time $T_5$, glow plug current is increased and combustion phase is further retarded to provide heat from the engine to the DPF to complete DPF regeneration. In one example, the glow plug current may be increased when the change in pressure across the DPF is reduced to a threshold level so as to complete regeneration of soot near the rear of the DPF.

At time $T_5$, the pressure differential across the DPF is reduced to a level less than a pressure differential where it is desirable to cease regeneration of the DPF. As a result, the regeneration request transitions to a low level and combustion phase is advanced to where combustion phase is responsive to engine speed and load without being responsive to catalyst temperature, DPF state, or engine temperature. Further, glow plug current is reduced to a low level where glow plug temperature is less than a threshold. In addition, glow plug power consumption is reduced to a level less than a threshold.

In this way, combustion phasing and glow plug current control can be adjusted to lower engine feedgas hydrocarbon emissions, promote combustion stability, and regenerate a DPF. Similar, control actions may be taken when regeneration of a lean NOx trap (LNT) or reduction of urea deposits on a SCR is requested. For example, when regeneration of a LNT is requested, glow plug current is increased and combustion phasing is retarded in response to glow plug temperature.

Referring now to FIGS. 5-11, a flowchart of a method for controlling a glow plug is shown. Method 500 is executable via instructions of a controller as shown in the system of FIGS. 1 and 2. Method 500 can provide the signals illustrated in FIGS. 2 and 3.

At 502, method 500 determines engine operating conditions. Engine operating conditions may include but are not limited to engine temperature, catalyst temperature, engine speed, engine torque, operator torque demand, glow plug current, and ambient temperature and pressure. Method 500 proceeds to 503 after engine operating conditions are determined.

At 503, method 500 judges whether or not the engine is being cold started. In one example, an engine cold start may be determined when an operator requests an engine start when engine temperature is less than a threshold temperature. Further, in some examples, a condition requiring a threshold amount of time between engine stop and engine start may be an additional condition for determining engine cold start. If the engine is being cold started, method 500 proceeds to 520. Otherwise, method 500 proceeds to 504.

At 504, method 500 judges whether or not the engine is experiencing a warm start. In one example, a warm engine start may be determined when an operator or controller requests an engine start from stop when engine temperature is greater than a threshold temperature. In some examples, a condition requiring less than a threshold amount of time between engine stop and engine start may be an additional condition for determining engine warm start. If method 500 determines that a warm start is requested, method 500 proceeds to 540. Otherwise, method 500 proceeds to 505.

At 505, method 500 judges whether or not regeneration of a DPF, LNT, SCR, HC trap or other emission control device is being requested. DPF regeneration may be requested when a pressure differential across a DPF is greater than a threshold level. LNT regeneration may be requested when efficiency of a LNT is less than a threshold level. Regeneration of other emissions devices may be requested by similar criteria. If method 500 judges that regeneration of an emission control device is being requested, method 500 proceeds to 550. Otherwise, method 500 proceeds to 506.

At 506, method 500 judges whether or not a catalyst light out is present or anticipated. A catalyst light out may be determined when a catalyst temperature is less than a threshold temperature during engine operation after the catalyst has reached light off temperature at least once. The catalyst temperature may be measured or inferred. Further, a catalyst light out can be anticipated or predicted based on the present catalyst temperature and the present engine load. For example, if the catalyst temperature is less than a threshold, and if the engine speed and load are less than a threshold, it may be anticipated that a catalyst light out will occur in a predetermined amount of time if no mitigating actions are taken. If method 500 judges that catalyst light out is present, method 500 proceeds to 560. Otherwise, method 500 proceeds to 507.

At 507, method 500 judges whether or not to adjust operation of a motor coupled to the engine. In one example, motor operation may be adjusted to increase negative torque provided by the motor to the engine when an operator torque request is less than a threshold level while a temperature of the glow plug is less than a threshold level. For example, negative motor torque may be provided during a period of time that it takes for a glow plug to transition from one temperature to a second higher temperature. Further, in some examples, engine torque output may be increased greater than operator desired torque during a time when a glow plug is heated from a first temperature to a second higher temperature so as to offset the negative torque increase of the motor. If engine operating conditions meet requirements for adjusting motor operation, method 500 proceeds to 570. Otherwise, if engine operating conditions do not meet requirements for adjusting motor operation or if no motor is present, method 500 proceeds to 508.

At 508, method 500 judges whether or not the engine is operating at a low load level where it may be desirable to activate or increase current to a glow plug to reduce engine emissions and improve combustion stability. In one example, method 500 may judge that the engine is operating at a load where increased glow plug current is desired when the engine is operated at a load less than a threshold level. Engine load may be determined from cylinder air amount, engine torque, or from injected fuel amount. If method 500 determines that the engine is operating at a low load, method 500 proceeds to 580. Otherwise, method 500 proceeds to 509.

At 509, method 500 deactivates glow plugs or reduces glow plug current to a low level. In one example, glow plug current is reduced to a level where glow plug power consumption is less than a threshold level. For example, the glow plugs may be operated at a current less than current supplied to the glow plug during engine cranking. In this way, glow plugs may continue to operate the entire time the engine is operated so that anytime a higher glow plug temperature is requested, current inrush to the glow plug may be reduced. In other words, glow plugs may be supplied current during all engine operations between engine stops. Thus, glow plug power consumption may be reduced when conditions at 503-508 are not present. Method 500 proceeds to 510 after glow plug power consumption is reduced.

At 510, method 500 adjusts engine combustion phasing in response to engine speed and engine load. In other words, after the engine reaches a desired operating temperature, the engine is adjusted according to base combustion phasing timing that is responsive to engine speed, load, and engine temperature. In some examples, a table with empirically determined desired combustion phase timing is indexed via engine speed and load. Thus, combustion phase is advanced and retarded as engine speed and load change so that desired engine torque may be provided at lower emission levels. Combustion phase is adjusted at 510 without adjustments for regeneration of emissions devices, engine starting, hybrid motors, or low load conditions. Method 500 proceeds to exit after combustion phase is adjusted.

Figure 6:
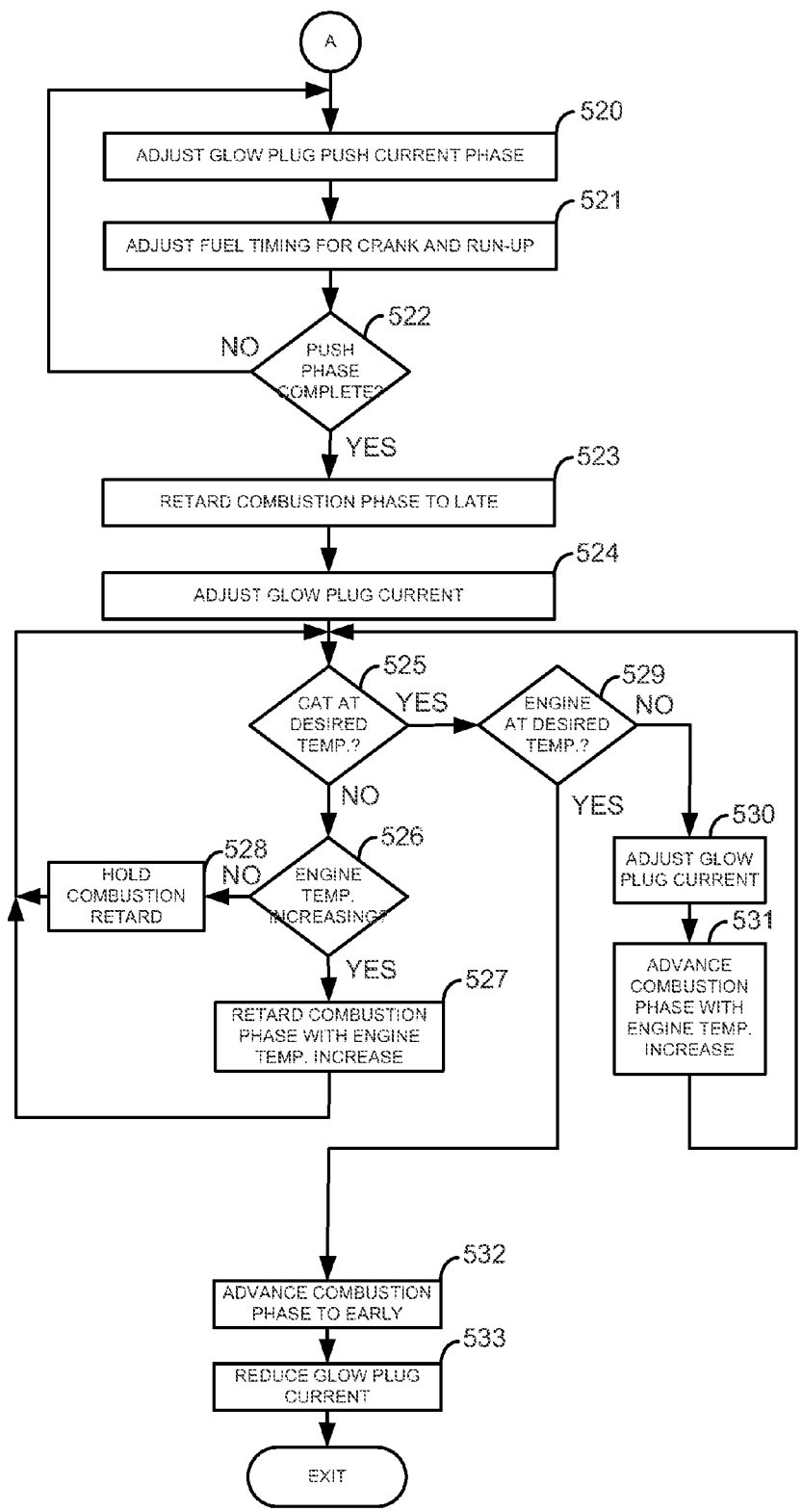

Referring now to FIG. 6, at 520, method 500 adjusts engine operation for cold engine starting by adjusting glow plug current during a current push phase. During a push phase current supplied to a glow plug is increased to a level where the glow plug reaches a desired temperature in a short amount of time so that the driver does not have to wait for an extended period of time before starting the engine. Thus, during the current push phase, current is supplied to the glow plug at a rate that is higher than other instances when current is supplied to the glow plug. In some examples, the engine may be allowed to crank during the current push phase. In other examples, the cranking the engine during the current push phase may be inhibited so that the glow plug reaches a desired temperature before an air-fuel mixture is compressed and exhausted from an engine cylinder. In still other examples, the engine may be allowed to crank but fuel injection is inhibited until the glow plug reaches a desired temperature. Current supplied to the glow plug during the current push phase may follow a predetermined profile based on engine temperature. For example, current supplied to the glow plug may be adjusted based on time since current is supplied to the glow plug and engine or glow plug temperature. Current supplied to the glow plug during the push phase may also be adjusted in response to a fuel cetane number of the fuel being combusted by the engine. For example, additional current may be supplied to the glow plug to increase glow plug temperature when combusting fuels having lower cetane numbers. On the other hand, less current may be supplied to a glow plug when combusting fuels having higher cetane numbers. Method 500 proceeds to 521 after push phase current is adjusted.

At 521, method 500 adjusts fuel timing. In one example, start of fuel injection as well as a number and duration of a plurality of fuel injections delivered to a cylinder during a single cycle of the cylinder may be adjusted to provide a desired engine torque and combustion phasing during engine cranking and run-up (e.g., the time between engine cranking and the time the engine reaches idle speed). In one example, combustion phasing is advanced during engine cranking and run-up. Fuel injection timing and fuel amount may be adjusted at predetermined times or engine positions during engine cranking and run-up. Method 500 proceeds to 522 after fuel timing is adjusted.

At 522, method 500 judges whether or not the current push phase is complete. In one example, the current push phase may be determined complete after a predetermined amount of time. In other examples, the current push phase may be determined complete when the glow plug reaches a predetermined temperature. The glow plug temperature may be inferred or measured. If the current push phase is complete, method 500 proceeds to 523. Otherwise, method 500 returns to 520.

At 523, method 500 retards combustion phasing from base combustion phase timing to a retarded or late timing. In one example, method 500 retards start of fuel injection timing for late phase combustion. Fuel injection start of injection timing can be retarded to shift combustion to late phase combustion. In one example, late phase combustion applies when peak cylinder mixture heat release occurs later than 5-20 crankshaft degrees after top dead center compression stroke of the cylinder, noting that base combustion phase varies with engine operating conditions. Combustion phase is initially retarded as a function of engine temperature and time since the engine was last stopped. Combustion phase may also be retarded in response to a cetane number of a fuel being combusted. For example, after the engine reaches idle speed, start of injection timing can be retarded further when fuels having a higher cetane number are combusted. Similarly, start of injection timing can be less retarded when fuels having lower cetane numbers are combusted. Combustion phasing may also be retarded via increasing EGR. Method 500 proceeds to 524 after fuel injection timing is adjusted to retard combustion phasing.

At 524, method 500 adjusts glow plug current to promote stable combustion during retarded combustion phasing. In one example, after the current push phase is complete, current is supplied to the glow plug based on the amount of combustion retard from base combustion phasing timing (e.g., combustion timing based on engine speed, load, and engine temperature). In addition, current supplied to the glow plug is increased as combustion phase is retarded until a glow plug threshold temperature is reached. For example, for every crankshaft degree that combustion phase is retarded from base combustion phase timing, a predetermined amount of additional current is supplied to a glow plug to increase glow plug temperature until a threshold glow plug temperature is reached. In some examples, the combustion phasing may be advanced in response to glow plug temperature so that the glow plug is at a temperature where combustion stability is at a desired level when engine combustion phase is retarded. In this way, there may be a higher probability of operating the engine at a desired combustion stability level.

Thus, at 523 and 524 initial glow plug current and combustion phasing are adjusted based on engine conditions shortly after engine start. Of course, glow plug current and combustion phase may be adjusted to different levels for different engine starting conditions. For example, combustion phase may be set to a first level of retard at a first engine temperature. Combustion phase may be set to a second level of retard at a second temperature, the second temperature higher than the first temperature the second level of retard greater than the first level of retard. Thus, additional heat flux is available at higher engine temperatures.

At 525, method 500 judges whether or not a catalyst in an exhaust system of the engine is at a desired temperature. In one example, the desired temperature is a catalyst light off temperature (e.g., a temperature of the catalyst where the catalyst has a predetermined operating efficiency). In other examples, the desired catalyst temperature may be above a catalyst light off temperature. If method 500 judges that the catalyst is not at a desired catalyst temperature, method 500 proceeds to 526. Otherwise, method 500 proceeds to 529.

At 526, method 500 judges whether or not engine temperature is increasing and/or if engine temperature has increased since the previous time method 500 was executed. If so, method 500 proceeds to 527. Otherwise, method 500 proceeds to 528.

At 527, method 500 retards combustion phasing so as to increase heat flux from the engine to the catalyst. The engine may be able to tolerate additional combustion phase retard since engine temperature is increasing. In one example, method 500 retards start of fuel injection timing for late phase combustion. Combustion phasing may also be retarded via increasing EGR, if desired. Method 500 returns to 525 after fuel injection timing is adjusted to retard combustion phasing.

At 528, method 500 holds combustion phasing at its present state so as to allow continued catalyst heating at the present engine temperature. However, combustion phase may be advanced at 528, 527, or 531 in response to an operator demand such as an increasing engine torque demand by the operator. In this way, engine torque may be increased to provide additional torque to the vehicle wheels. Method 500 returns to 525.

Thus, method 500 can further increase combustion phase retard as engine temperature increases in order to shorten catalyst light off time as engine temperature increases. In this way, method 500 can focus on shortening catalyst light off time to reduce engine tailpipe emissions.

At 529, method 500 judges whether or not the engine is at a desired temperature. In one example, the desired engine temperature is a warm stabilized operating temperature (e.g., 90° C.). Engine temperature may be an engine coolant temperature, cylinder head temperature, or another engine temperature. If method 500 judges that the engine is at a desired engine temperature, method 500 proceeds to 532. Otherwise, method 500 proceeds to 530.

At 530, method 500 adjusts glow plug current in response to the present engine temperature. In particular, an amount of current is subtracted from the initial glow plug current at 524 as engine temperature increases from a temperature at engine start. Thus, at lower engine temperatures less current is subtracted from the initial current provided to the glow plug at 524. As engine temperature increases from the engine start, additional current is subtracted from the initial amount of current supplied to the glow plug. In one example, a low level of current may still be supplied to the glow plug when the engine reaches the desired engine temperature such that the glow plugs remain active during engine operation albeit at a lower temperature.

Glow plug current may also be adjusted in response to a fuel cetane number at 530. For example, after the engine reaches idle speed after run up, an increased amount of current may be supplied to a glow plug to increase glow plug temperature when combusting fuels having lower cetane numbers. Similarly, less current may be supplied to a glow plug when combusting fuels having higher cetane numbers after engine idle speed is reached. In some examples, a fuel cetane number may be inferred based on engine operating conditions. Method 500 proceeds to 531 after glow plug current is adjusted.

At 531, method 500 adjusts combustion phase in response to present engine temperature. Specifically, combustion phase is advanced as engine temperature increases after the catalyst has achieved a desired temperature. Combustion phase may be advanced via adjusting engine EGR amount, advancing start of fuel injection timing, and/or engine air temperature. For example, EGR amount can be decreased to advance combustion phase as engine temperature increases. Method 500 returns to 525 after combustion phase is adjusted.

At 532, method 500 advances combustion phasing to base combustion phasing. By advancing combustion phasing the engine may be operated more efficiently as compared to when combustion phasing is retarded to heat the engine or catalyst. Combustion phase may be advanced via adjusting start of fuel injection timing, decreasing EGR, and/or increasing engine air charge temperature as previously described. Method 500 proceeds to 533 after combustion phase is advanced.

At 533, method 500 reduces glow plug current. In particular, glow plug current can be set to zero or to a low amount where glow plug power consumption is less than a threshold amount. In other examples, glow plug current may be set to a current where glow plug temperature is less than a threshold amount when engine speed and load are greater than threshold engine speed and load levels. Method 500 proceeds to exit after glow plug current is reduced.

Figure 7:
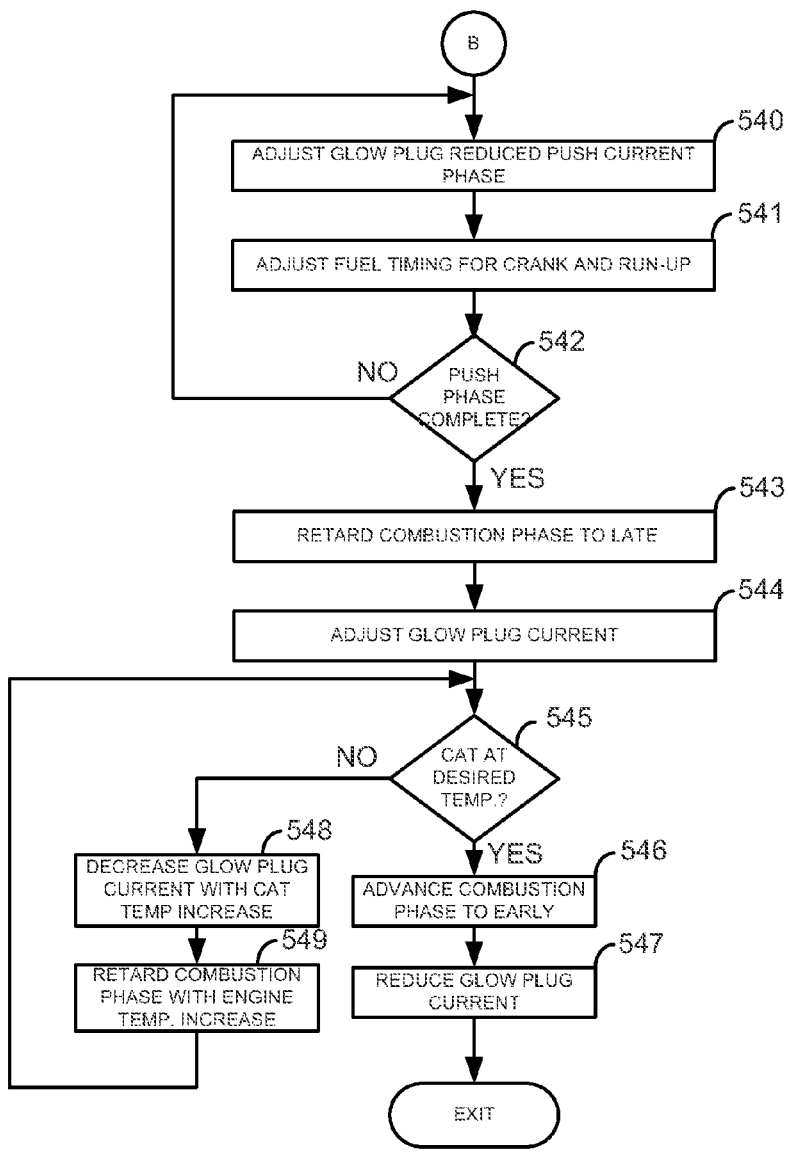

Referring now to FIG. 7, at 540, method 500 adjusts engine operation for warm engine starting by adjusting glow plug current during a current push phase. During a warm engine start, the current supplied to a glow plug in a push phase may be equivalent, greater than, or less than an amount of current provided to the glow plug during a cold engine start. In some examples, current supplied in the push phase may be greater than the current supplied during a current push phase of a cold engine start because the glow plug may have a higher initial temperature so as to reduce thermal stress created by supplying current to the glow plug. In some examples, push current may be eliminated and only a lower glow current (e.g., current that is less than a current that provides glow plug temperature less than glow plug rated temperature) may be provided. The current supplied to the glow plug during a warm engine start may be a function of time since engine stop and glow plug and/or engine temperature. Method 500 proceeds to 541 after push phase current is adjusted.

At 541, method 500 adjusts fuel timing. In one example, start of fuel injection as well as a number and duration of a plurality of fuel injections delivered to a cylinder during a single cycle of the cylinder may be adjusted to provide a desired engine torque and combustion phasing during engine cranking and run-up (e.g., the time between engine cranking and the time the engine reaches idle speed). Method 500 proceeds to 542 after fuel timing is adjusted.

At 542, method 500 judges whether or not the current push phase is complete. In one example, the current push phase may be determined complete after a predetermined amount of time. In other examples, the current push phase may be determined complete when the glow plug reaches a predetermined temperature. Engine cranking may be permitted during or after the push phase is complete. If the current push phase is complete, method 500 proceeds to 543. Otherwise, method 500 returns to 540.

At 543, method 500 retards combustion phase from base combustion phase timing to late timing. Combustion phase is retarded after the engine runs up to idle speed. In one example, start of fuel injection timing is retarded for late phase combustion. In other examples, combustion phase can be retarded by retarding start of injection timing, increasing EGR, and/or decreasing engine inlet air temperature. Combustion phase is initially retarded as a function of catalyst temperature and time since the engine was last stopped. Combustion phase may also be adjusted in response to a cetane number of a fuel being combusted during the warm engine start. For example, after the engine reaches idle speed, start of injection timing can be retarded further when fuels having a higher cetane number are combusted. Similarly, start of injection timing can be less retarded when fuels having lower cetane numbers are combusted. Method 500 proceeds to 544 after fuel injection timing is adjusted to retard combustion phasing.

At 544, method 500 adjusts glow plug current to promote stable combustion during retarded combustion phasing. In one example, after the current push phase is complete, current supplied to the glow plug is based on the amount of combustion retard from desired base combustion phasing (e.g., combustion timing based on engine speed, load, and engine temperature), and the combustion phase retard may be further based on catalyst temperature at time of engine start. Further, current supplied to the glow plug is increased as combustion phase is retarded from base combustion phase timing at least until a glow plug threshold temperature is reached. For example, if it is determined that it is desirable to retard combustion phase five crankshaft degrees from base combustion phase timing in response to catalyst temperature, glow plug current is increased such that the glow plug reaches a temperature where combustion stability reaches a threshold level. The current may be maintained at a level where a desired glow plug temperature is reached so that the stable combustion is provided. As the catalyst temperature increases, the combustion phasing can be advanced and the glow plug current can be reduced because the catalyst can process some hydrocarbons.

At 545, method 500 judges whether or not a catalyst in an exhaust system of the engine is at a desired temperature. In one example, the desired temperature is a catalyst light off temperature (e.g., a temperature of the catalyst where the catalyst has a predetermined operating efficiency). In other examples, the desired catalyst temperature may be above a catalyst light off temperature (e.g., the temperature represented by horizontal line 304). If method judges that the catalyst is at a desired catalyst temperature, method 500 proceeds to 546. Otherwise, method 500 proceeds to 548.

At 548, method 500 adjusts glow plug current in response to the present catalyst temperature. In particular, an amount of current is subtracted from the initial glow plug current at 544 as catalyst temperature increases from a temperature at engine start until desired catalyst temperature is reached. Thus, when the engine is restarted warm and the catalyst temperature is lower, less current is subtracted from the initial current provided to the glow plug at 544. As catalyst temperature increases from the engine start, additional current is subtracted from the initial amount of current supplied to the glow plug. In one example, a small amount of current may still be supplied to the glow plug when the catalyst reaches the desired catalyst temperature. Alternatively, glow plug current may be held constant so that combustion phase can be retarded further as engine temperature increases until the catalyst reaches light off temperature. Method 500 proceeds to 549 after glow plug current is adjusted.

At 549, method 500 retards combustion phase in response to increasing engine temperature. In particular, combustion phase is retarded as engine temperature increases from the engine temperature at time of engine start until the engine reaches operating temperature. Combustion phase may be retarded via adjusting start of injection timing or increasing engine EGR amount. Method 500 returns to 545 after combustion phase is adjusted.

In this way, method 500 adjusts glow plug current and temperature as well as combustion phase during a warm engine start in response to catalyst temperature without adjusting for engine temperature since engine temperature is above a desired engine temperature.

At 546, method 500 advances combustion phasing to base combustion phasing. By advancing combustion phasing the engine may be operated more efficiently as compared to when combustion phasing is retarded to heat the engine or catalyst. Combustion phase may be advanced via adjusting start of fuel injection timing, decreasing EGR, and/or increasing engine air charge temperature as previously described. Method 500 proceeds to 547 after combustion phase is advanced.

At 547, method 500 reduces glow plug current. In particular, glow plug current can be set to zero or to a low amount where glow plug power consumption is less than a threshold amount. In other examples, glow plug current may be set to a current where glow plug temperature is less than a threshold amount when engine speed and load are greater than threshold engine speed and load levels so as to limit glow plug temperature. Method 500 proceeds to exit after glow plug current is reduced.

Figure 8:
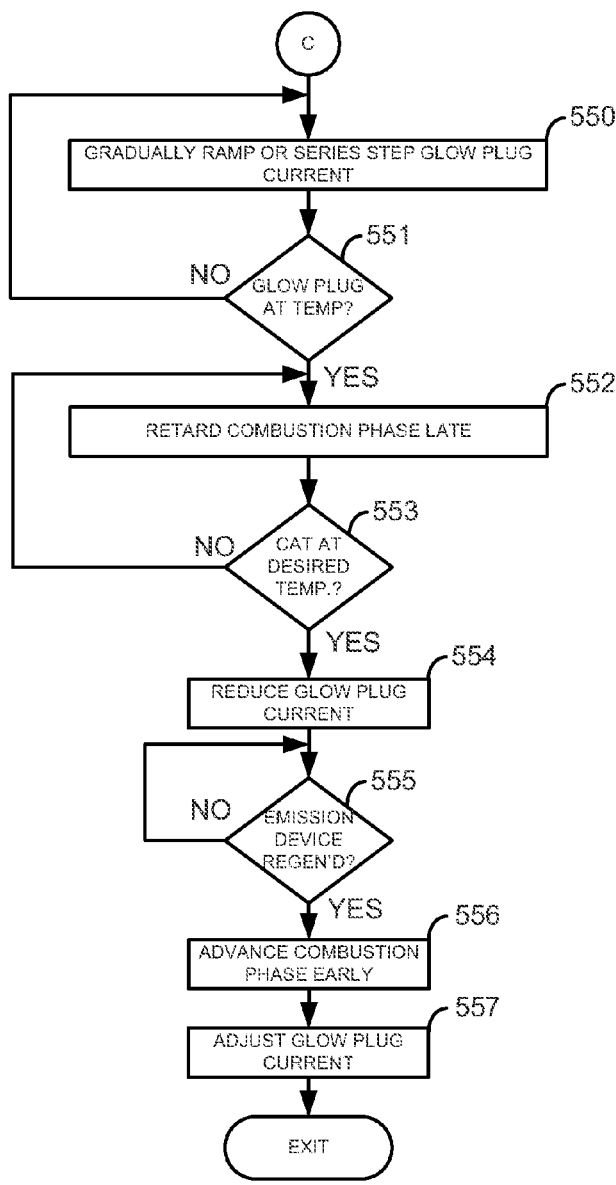

Referring now to FIG. 8, at 550, method 500 begins to adjust engine operation for regeneration of an engine exhaust after treatment emissions device (e.g., DPF or LNT). In particular, method 500 begins to gradually ramp or step current up glow plug current without adjusting combustion phasing timing. For example, glow plug current can be increased in a series of incremental steps or continuously increased until a desired glow plug current is reached. The glow plug current is increased before the engine combustion phase is adjusted so that the heating time constant (e.g., the time that it takes for a glow plug to heat to a predetermined percentage of a desired glow plug temperature when current is applied to the glow plug) of the glow plug is taken into account during regeneration of an exhaust emissions control device. Method 500 proceeds to 551 after glow plug current is adjusted.

At 551, method 500 judges whether or not the glow plug is at a desired temperature. The temperature of a glow plug may be measured via a temperature sensor or estimated via a model or based on time since current is supplied to the glow plug. If method 500 judges that the glow plug is not at a desired temperature, method 500 returns to 550. Otherwise, method 500 proceeds to 552.

At 552, method 500 adjusts the combustion phase of the engine and begins post combustion injection (e.g., injection during the exhaust stroke of the cylinder). In particular, the combustion phase is retarded from base combustion timing. In one example, method 500 retards combustion phase timing via retarding start of fuel injection timing or increasing EGR. Further, in one example, combustion phasing is retarded based on a pressure differential across the emissions control device. For example, combustion phase may be adjusted to an initial level based on the pressure differential across an emissions control device and then retarded further as the pressure differential across the emissions control device is reduced until the emissions control device is regenerated at which time combustion phase is returned to base combustion phase timing. In addition, increased retarding of combustion phase after a portion of the emissions control device is regenerated may increase a temperature of the emissions control device so that particulate matter or an amount of matter (e.g., $SO_2$) held at a furthest downstream end of the emissions device or a downstream emissions device is reduced without the emissions control device reaching an undesirable temperature. Method 500 proceeds to 553 after engine combustion phase is adjusted.

At 553, method 500 judges whether or not a catalyst located upstream of the emissions control device to be regenerated in a direction of exhaust flow through the exhaust system is at or above a desired temperature. In one example, the desired catalyst temperature is a catalyst light off temperature. If method 500 judges the catalyst temperature to be at or above the desired temperature, method 500 proceeds to 554. Otherwise, method 500 returns to 552.

At 554, method 500 reduces glow plug current since the catalyst can convert hydrocarbons that may be produced by the engine after catalyst light off. In particular, glow plug current is reduced based on catalyst temperature. For example, glow plug current may be decreased a predetermined amount for every 20° C. increase in catalyst temperature. In some examples, glow plug current may be subsequently raised after a predetermined amount of the emission control device has been regenerated so that engine heat may facilitate regeneration of a remaining portion of the emissions control device. Method 500 proceeds to 555 after the glow plug current is reduced after catalyst light off.

At 555, method 500 judges whether or not the DPF, LNT, SCR, HC trap or other emission device is regenerated. In one example, a DPF may be determined to be regenerated when a pressure differential across the DPF is less than a threshold pressure. In another example, a LNT may be determined to be regenerated when a conversion efficiency of the LNT is greater than a threshold level. Other emissions devices may be judged to be regenerated in a similar manner. If it is judged that the exhaust after treatment emissions device is regenerated, method 500 proceeds to 556. Otherwise, method 500 returns to 557.

At 556, method 500 advances combustion phasing to base combustion phase timing. In one example, combustion phase may be advanced over a predetermined number of cylinder cycles so as to provide a smooth torque transition. In other examples, combustion phase may be advanced over a predetermined amount of time since the exhaust after treatment emissions device is determined to be regenerated. Method 500 proceeds to 557 after combustion phase is advanced.

At 557, method 500 reduces glow plug current in response to regeneration of the exhaust after treatment emissions device. In one example, glow plug current may be reduced based on a number of cylinder events (e.g., combustion events or intake events) since exhaust after treatment device regeneration. In this way, glow plug current can be adjusted responsive to cylinder events so as to better match glow plug temperature to engine cylinder operating conditions. In other examples, glow plug current may be reduced based on time since exhaust after treatment device regeneration. Glow plug current flow may be stopped or reduced to where glow plug power consumption is less than a threshold level. Method 500 proceeds to exit after glow plug current is adjusted.

Figure 9:
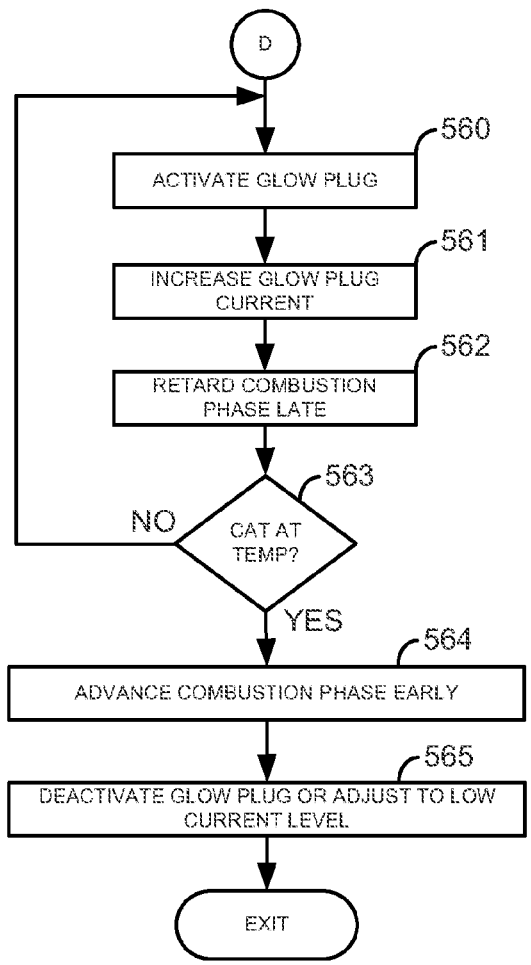

Referring now to FIG. 9, at 560, method 500 begins to adjust engine operation for conditions where a catalyst light out is present or anticipated (e.g., where catalyst temperature is reduced to a temperature less than catalyst light off temperature during engine operation). In particular, a glow plug is activated by supplying current to the glow plug in response to catalyst temperature falling below light off temperature after reaching and/or exceeding catalyst light off temperature during a period of time the engine is continuously combusting air-fuel mixtures. Method 500 proceeds to 561 after glow plugs are activated.

At 561, method 500 increases glow plug current so that combustion timing of the engine can be retarded. In one example, the glow plug current is increased based on an amount of time that it is desirable to return the catalyst to catalyst light off temperature or greater. For example, if it is desirable to return the catalyst above light off temperature in one minute, engine combustion phase can be retarded an empirically determined amount based on time to return the catalyst above light off temperature in one minute (e.g., ten crankshaft degrees) at the retarded combustion phase, and glow plug current is increased to a level that supports a desired level of combustion stability at the retarded engine combustion phase. Method 500 proceeds to 562 after glow plug current is increased.

At 562, method 500 retards combustion phasing to late timing as compared to base combustion phase timing. In one example, combustion phase is adjusted based on an amount of time it is desirable for the catalyst to reach light off temperature or greater. In one example, an amount of empirically determined combustion phase retard to return a catalyst to light off temperature is indexed via a desired amount of time to return the catalyst to light off temperature or greater. In other examples, combustion phase retard is based on a temperature difference between the catalyst and catalyst light off temperature. Further, retarding of combustion phase can be based on glow plug temperature. In other words, combustion phasing is retarded at a rate that is related to or based on the temperature of the glow plug. As the glow plug temperature increases, combustion phase can be further retarded up to a threshold amount. Method 500 proceeds to 563 after retarding combustion phase.

At 563, method 500 judges whether or not catalyst temperature is at or above a desired temperature. In one example, the desired catalyst temperature is catalyst light off temperature. In other examples, the desired catalyst temperature is greater than the catalyst light off temperature. Method 500 proceeds to 564 when catalyst temperature is at or above the desire temperature. Otherwise, method 500 returns to 560.

At 564, method 500 deactivates a glow plug by stopping current flow or reducing current flow to the glow plug to a level where glow plug power consumption is less than a threshold level. Thus, power consumption of the glow plug can be reduced after the catalyst temperature is increased. Method 500 proceeds to 565 after glow plug current is adjusted.

At 565, method 500 advances combustion phase timing. Method 500 advances combustion phase timing by advancing start of fuel injection timing, decreasing EGR amount, and/or increasing engine inlet air temperature. Method 500 proceeds to exit after combustion phase timing is advanced.

Figure 10:
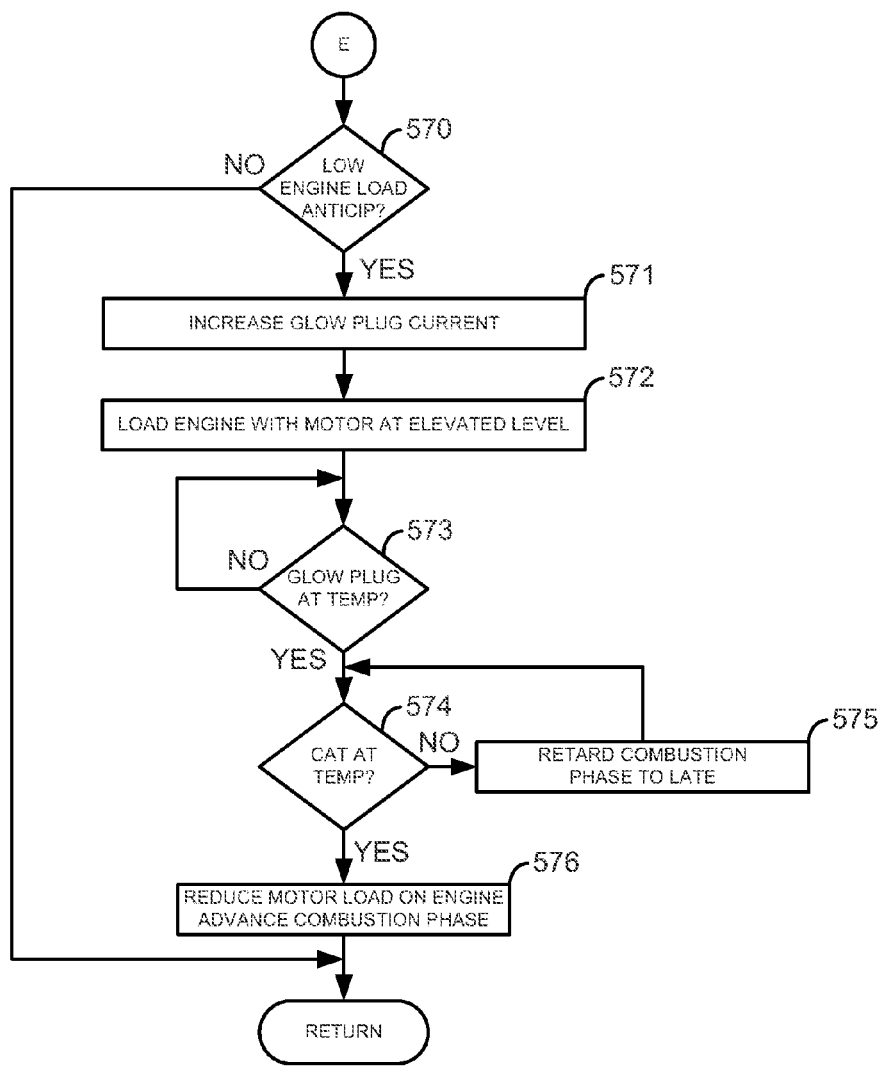

Referring now to FIG. 10, at 570, method 500 judges whether or not low engine load is anticipated during vehicle operation. In one example, low engine load can be anticipated based on driver torque demand. For example, an engine may be operating at a medium to high load when the operator reduces the engine torque demand. It can take an engine a finite amount of time for the engine to respond to the operator torque demand. As such, a difference between actual or estimated engine torque and operator torque demand can be the basis of determining that engine load may shortly reach a low load operating state where combustion stability may degrade. For example, if engine torque is greater than operator demand torque by more than a threshold amount of torque, method 500 may anticipate that the engine may eventually enter low load conditions. If method 500 judges low engine load is anticipated, method 500 proceeds to 571. Otherwise, method 500 returns to 508.

At 571, method 500 increases glow plug current to increase glow plug temperature in anticipation of the engine operating at a low load. Glow plug current is increased to compensate for the engine operating at a low loads where combustion stability may degrade and hydrocarbons may increase. However, the glow plug has a heating time constant such that the glow plug may not reach a desired temperature to promote combustion stability for a predetermined amount of time after current is applied to the glow plug. Thus, it may be desirable to operate the engine at a higher load until the glow plug reaches a temperature that promotes a desired level of combustion stability at low engine load. The glow plug temperature increases after current is supplied to the glow plug. Method 500 proceeds to 572 after glow plug current is increased.

At 572, negative torque output of a motor coupled to the engine is increased. Further, the speed of the engine is also controlled so that the engine does not stop or decrease to a speed where undesirable vibration occurs. The engine torque is increased to a level where the net torque from the engine and the motor provide the driver demand torque to the vehicle driveline even though the engine torque is greater than the driver demand torque. In this way, the engine torque or load is increased to a level where the engine operates with a desired level of combustion stability while the glow plug heats up to a desired temperature. By increasing motor negative torque, battery recharging can be increased. Method 500 proceeds to 573 after motor negative torque is increased and after engine torque is held at a level where a desired level of combustion stability is provided.

At 573, method 500 judges whether or not glow plug temperature is at a desired temperature. In one example, the desired temperature is an empirically determined temperature where combustion stability at low load is greater than a threshold level. If so, method 500 proceeds to 574. Otherwise, method 500 returns to 573.

At 574, method 500 judges whether or not a catalyst in the engine exhaust system is at a desired temperature. In one example, the desired catalyst temperature is a temperature a catalyst light off temperature. In other examples, the desired catalyst temperature may be greater than the catalyst light off temperature. If the catalyst is at the desired temperature, method 500 proceeds to 576. Otherwise, method 500 proceeds to 575.

At 575, method 500 retards combustion phase timing from base combustion phase timing so as to increase catalyst temperature to a desired temperature. Combustion phase timing can be retarded by retarding start of fuel injection timing, increasing engine EGR, and decreasing intake air temperature. In one example, combustion phase retard amount may be based on a temperature difference between desired and actual catalyst temperatures. For example, if catalyst temperature is 200° C. less than desired catalyst temperature, combustion phase may be retarded a predetermined number of crankshaft degrees. However, of catalyst temperature is 20° C. less than desired catalyst temperature; combustion phase may be retarded less than the predetermined number of crankshaft degrees from base combustion phase timing. Method 500 returns to 574 after combustion phase is adjusted.

At 576, method 500 reduces motor negative torque and advances combustion phase to a base combustion phase timing. The engine speed controller correspondingly reduces engine torque since less engine torque is required to operate the engine at a desired speed when negative motor torque is reduced. Thus, the engine load is reduced so that the engine may transition to the torque requested by the operator. In this way, the engine may be operated at a higher load than is requested by the vehicle operator until the glow plug is at a temperature where combustion stability is at a desired level. This mode of operation may be particularly desirable when the engine may be operating at a temperature lower than a desired engine temperature. Method 500 returns to 508 after motor negative torque is reduced.

Figure 11:
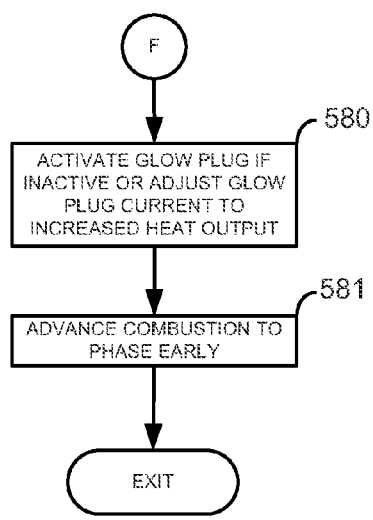

Referring now to FIG. 11, at 580 method 500 activates the glow plug if the glow plug is inactive or increases glow plug heat output via increasing glow plug current as compared to when the engine is warm and not operating at low load or idle conditions. Method 500 proceeds to 581 after the glow plug output is increased.

At 581, method 500 advances combustion phase to early where the engine may provide torque more efficiently. Since engine load is low at 581, engine NOx is expected to be low. Method 500 proceeds to exit after combustion phase is advanced.

Note that when the engine leaves low load or idle conditions, the glow plug output can be degreased or stopped via reducing glow plug current.

Thus, the method of FIGS. 5-11 provides for performing combustion in a cylinder of an engine; and retarding combustion phasing in the cylinder and increasing current supplied to a glow plug in the cylinder in response to a temperature of a catalyst and a temperature of the engine. In this way, engine emissions and combustion stability may be improved. The engine operating method further comprises retarding combustion phasing in the cylinder and increasing current to the glow plug in response to a request to regenerate an emissions control device in an exhaust system coupled to the engine. The engine operating method also includes where the temperature of the engine is indicative of a warm engine operating temperature (e.g., nominal operating temperature of 90° C.). In some examples, the engine operating method includes where the temperature of the catalyst is less than a catalyst light off temperature. The engine operating method further comprises advancing combustion phasing of the cylinder and reducing current supplied to the glow plug when the catalyst reaches a threshold temperature. The engine operating method further comprises retarding combustion phasing of the cylinder and increasing current supplied to the glow plug when a load level of the cylinder is less than a threshold load level. In other examples, the engine operating method further comprises anticipating a catalyst light out via engine control parameters (e.g., present catalyst temperature, time in present mode, and engine exhaust gas temperature) and retarding combustion phasing in the cylinder and increasing current supplied to a glow plug in the cylinder in response to the catalyst light out.

The method of FIGS. 5-11 also provides for performing combustion in a cylinder of an engine; retarding combustion phasing of the cylinder and increasing current supplied to a glow plug in the cylinder in response to a temperature of a catalyst and a temperature of the engine; and increasing glow plug current and retarding combustion phasing of the cylinder in response to an operating condition of a degraded condition of an emissions control device. The engine operating method includes where the degraded condition of the emissions control device is a differential pressure greater than a threshold level. The engine operating method also includes where the degraded condition of the emissions control device is an efficiency of the emissions control device less than a threshold level due to degradation of the emissions control device including a light out condition. In one example, the engine operating method further comprises advancing combustion phasing of the cylinder and decreasing glow plug current in response to the an operating condition of the emissions control device. The engine operating method further comprises increasing combustion phase retard after a portion of the emissions control device is regenerated. In this way, regeneration of the remainder of the emissions device can be facilitated. The engine operating method further comprises advancing combustion phasing to base combustion phase timing after the emissions control device is regenerated. The engine operating method further comprises continuing to supply current to the glow plug after the emissions control device is regenerated to reduce current inrush during a subsequent increase in glow plug current.

As will be appreciated by one of ordinary skill in the art, the method described in FIGS. 5-11 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps, methods, or functions may be repeatedly performed depending on the particular strategy being used.

This concludes the description. The reading of it by those skilled in the art would bring to mind many alterations and modifications without departing from the spirit and the scope of the description. For example, single cylinder, I2, I3, I4, I5, V6, V8, V10, V12 and V16 engines operating in natural gas, gasoline, diesel, or alternative fuel configurations could use the present description to advantage.

The invention claimed is:

1. An engine system, comprising:
an engine having a combustion chamber;
a turbocharger coupled to the engine having a compressor and turbine;
a glow plug protruding into the combustion chamber; and
a controller including instructions to identify a catalyst light out and retard combustion phasing in the combustion chamber and increasing current supplied to a glow plug in the combustion chamber in response to the catalyst light out after the engine has reached a temperature indicative of warm engine operating conditions.

2. The engine system of claim 1, further comprising continuously supplying a current to the glow plug throughout a time when the engine is operating, the system further comprising an electric motor/battery system coupled to the engine, the system in a hybrid vehicle.

3. The engine system of claim 1, further comprising additional controller instructions for increasing a negative torque supplied to the engine via a motor in response to a request to increase a temperature of the glow plug.

4. The engine system of claim 1, further comprising additional controller instructions for retarding combustion phasing of the combustion chamber and increasing current supplied to the glow plug in response to a request to regenerate an emissions control device in an exhaust system that is coupled to the engine.

5. The engine system of claim 4, further comprising additional controller instructions for gradually ramping glow plug temperature in response to the request to regenerate the emissions control device.

6. The engine system of claim 5, further comprising additional controller instructions for advancing combustion phasing of the combustion chamber in response to a level of regeneration of the emissions control device, and where the emissions control device is a DPF or LNT.

7. An engine operating method, comprising:
performing combustion in a cylinder of a turbocharged engine via compression of fuel until it ignites;
retarding combustion phasing of the cylinder and increasing current supplied to a glow plug in the cylinder in response to a temperature of a catalyst and a temperature of the engine; and
increasing glow plug current and retarding combustion phasing of the cylinder in response to an operating condition of a degraded condition of an emissions control device.

8. The engine operating method of claim 7, where the degraded condition of the emissions control device is a differential pressure greater than a threshold level.

9. The engine operating method of claim 7, where the degraded condition of the emissions control device is an efficiency of the emissions control device less than a threshold level due to degradation of the emissions control device.

10. The engine operating method of claim 7, further comprising advancing combustion phasing of the cylinder and decreasing glow plug current in response to an operating condition of the emissions control device.

11. The engine operating method of claim 7, further comprising increasing combustion phase retard after a portion of the emissions control device is regenerated.

12. The engine operating method of claim 11, further comprising advancing combustion phasing to base combustion phase timing after the emissions control device is regenerated.

13. The engine operating method of claim 12, further comprising continuing to supply current to the glow plug after the emissions control device is regenerated.

14. An engine operating method, comprising:
combusting diesel fuel in an engine cylinder;
retarding combustion phasing in the cylinder and increasing current supplied to a glow plug in the cylinder in response to a temperature of a catalyst and a temperature of the engine; and
increasing a negative torque supplied to the engine via a motor in response to a request to increase glow plug temperature.

15. The engine operating method of claim 14, further comprising spinning a turbine with cylinder exhaust gasses to drive a compressor to compress intake air; and retarding combustion phasing in the cylinder and increasing current to the glow plug in response to a request to regenerate an emissions control device in an exhaust system coupled to the engine.

16. The engine operating method of claim 14, where the temperature of the engine is indicative of a warm engine operating temperature, wherein the engine is coupled to the motor in a hybrid vehicle.

17. The engine operating method of claim 16, where the temperature of the catalyst is less than a catalyst light off temperature.

18. The engine operating method of claim 14, further comprising advancing combustion phasing of the cylinder and reducing current supplied to the glow plug when the catalyst reaches a threshold temperature.

19. The engine operating method of claim 14, further comprising retarding combustion phasing of the cylinder and increasing current supplied to the glow plug when a load level of the cylinder is less than a threshold load level.

20. The engine operating method of claim 14, further comprising anticipating or identifying a catalyst light out and retarding combustion phasing in the cylinder and increasing current supplied to the glow plug in the cylinder in response to the catalyst light out.

* * * * *